United States Patent
Sasano

(10) Patent No.: US 7,719,608 B2
(45) Date of Patent: May 18, 2010

(54) IMAGE PICKUP APPARATUS, METHOD FOR CONTROLLING THE IMAGE PICKUP APPARATUS, AND COMPUTER READABLE MEDIUM STORING A PROGRAM FOR CONTROLLING THE MODE SETTING OF THE IMAGE PICKUP APPARATUS

(75) Inventor: Takaaki Sasano, Tokyo (JP)

(73) Assignee: Sony Corporation, Tokyo (JP)

( * ) Notice: Subject to any disclaimer, the term of this patent is extended or adjusted under 35 U.S.C. 154(b) by 600 days.

(21) Appl. No.: 11/567,988

(22) Filed: Dec. 7, 2006

(65) Prior Publication Data
US 2007/0146540 A1 Jun. 28, 2007

(30) Foreign Application Priority Data
Dec. 27, 2005 (JP) ............... 2005-374245

(51) Int. Cl.
H04N 5/225 (2006.01)
H04N 5/222 (2006.01)
(52) U.S. Cl. .................... 348/372; 348/333.13
(58) Field of Classification Search ............... 348/372, 348/333.13
See application file for complete search history.

(56) References Cited

U.S. PATENT DOCUMENTS

| 6,016,407 | A  | * | 1/2000  | Tsukahara ............ 396/302 |
| 6,111,609 | A  | * | 8/2000  | Stevens ............. 348/372 |
| 6,346,937 | B1 | * | 2/2002  | Sasaki et al. ......... 345/211 |
| 6,968,118 | B1 | * | 11/2005 | Yamagishi et al. ....... 386/107 |
| 7,312,826 | B2 | * | 12/2007 | Ishii ............... 348/312 |
| 2001/0015760 | A1 | * | 8/2001  | Fellegara et al. ...... 348/333.01 |
| 2003/0142228 | A1 | * | 7/2003  | Flach et al. ......... 348/335 |
| 2004/0017484 | A1 | * | 1/2004  | Tagawa ............. 348/207.99 |
| 2004/0051807 | A1 | * | 3/2004  | Niwa ............... 348/372 |
| 2005/0157178 | A1 | * | 7/2005  | Miyata ............. 348/207.99 |
| 2005/0237412 | A1 | * | 10/2005 | Shiohara et al. ....... 348/333.11 |
| 2008/0143869 | A1 | * | 6/2008  | Kashiwagi ........... 348/372 |

FOREIGN PATENT DOCUMENTS

| JP | 09135377   | A | * | 5/1997  |
| JP | 2001326839 | A | * | 11/2001 |
| JP | 2003140216 | A | * | 5/2003  |
| JP | 2003274277 | A | * | 9/2003  |
| JP | 2005318649 | A | * | 11/2005 |

* cited by examiner

Primary Examiner—John M Villecco
(74) Attorney, Agent, or Firm—Oblon, Spivak, McClelland, Maier & Neustadt, L.L.P.

(57) ABSTRACT

An image pickup apparatus includes an image pickup unit for picking up an image, a lens barrier for covering the front of a lens of the image pickup unit, a display for displaying image data recorded on a recording unit, and a controller for controlling mode switching of the image pickup apparatus in response to a mode switching command from a mode switching unit. The controller switches among three modes including an image pickup mode, a play mode, and a review mode. During the image pickup mode, power is supplied to the image pickup unit for image pickup. During the play mode, data is played on the display with power supplied to the image pickup unit for image pickup. After an elapse of a predetermined threshold time, power supplying to the image pickup unit is stopped. During the review mode, data is played on the display.

7 Claims, 7 Drawing Sheets

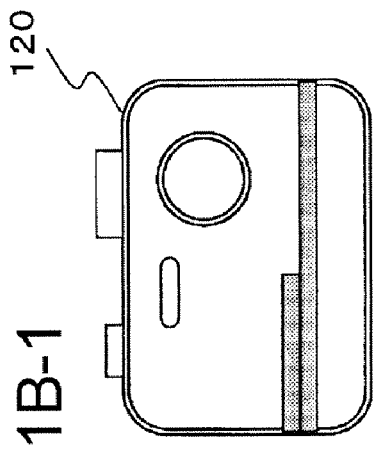
FIG. 1B-1
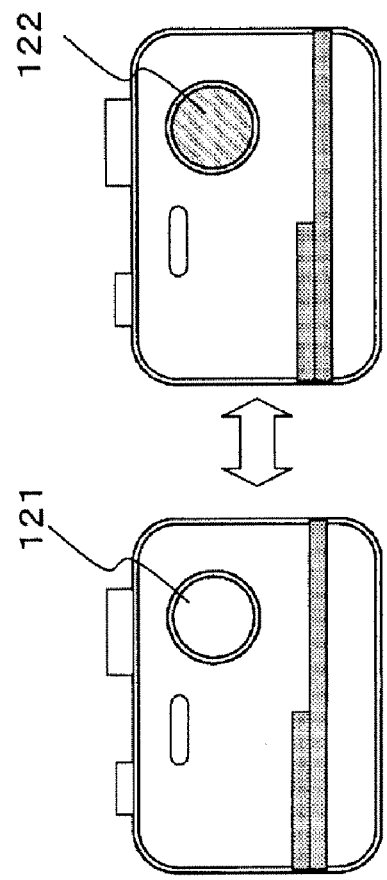
FIG. 1B-3
FIG. 1B-2
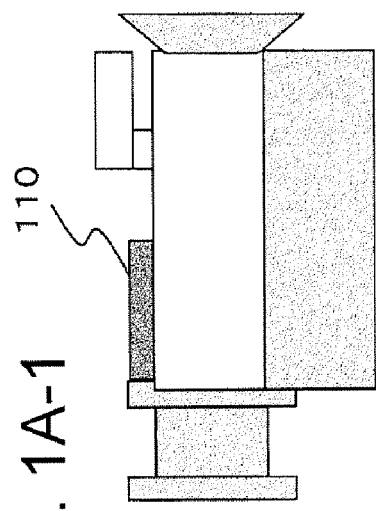
FIG. 1A-1
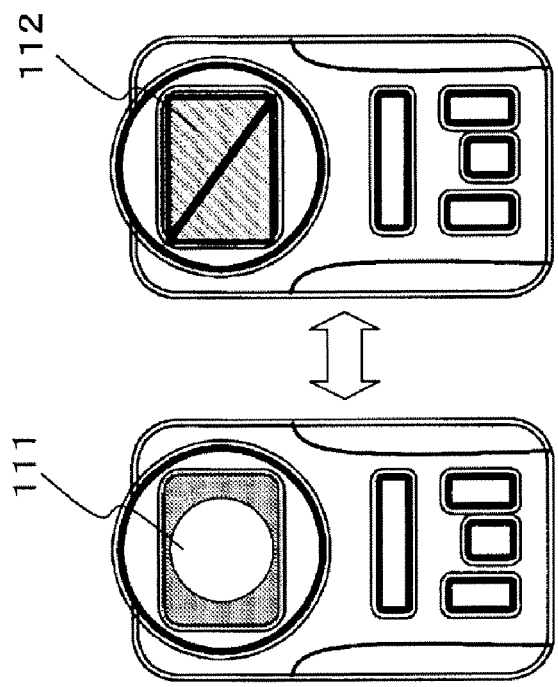
FIG. 1A-3
FIG. 1A-2

IMAGE PICKUP APPARATUS, METHOD FOR CONTROLLING THE IMAGE PICKUP APPARATUS, AND COMPUTER READABLE MEDIUM STORING A PROGRAM FOR CONTROLLING THE MODE SETTING OF THE IMAGE PICKUP APPARATUS

CROSS REFERENCES TO RELATED APPLICATIONS

The present invention contains subject matter related to Japanese Patent Application JP 2005-374245 filed in the Japanese Patent Office on Dec. 27, 2005, the entire contents of which are incorporated herein by reference.

BACKGROUND OF THE INVENTION

1. Field of the Invention

The present invention relates to an image pickup apparatus, a method of controlling the same, and a computer program. In particular, the present invention relates to an image pickup apparatus, a method of controlling the same, and a computer program for controlling mode setting and an image pickup unit in the image pickup apparatus such as a still camera, or a video camera, and a lens barrier as a lens protecting cover plate.

2. Description of the Related Art

Some of image pickup apparatuses such as a still camera or a video camera include a lens barrier as a lens protecting cover plate. When no image pickup is performed, the lens barrier is closed to protect a lens.

Currently available digital cameras perform a state determination process as to whether image pickup is under way or not in response to a variety of user operation information, and controls the opening and closing of the lens barrier.

Many digital cameras are powered from a battery. To save power from the battery, power supplying to the image pickup unit including a lens driver in the image pickup apparatus is typically suspended while a user does not operate the apparatus for image pickup. For example, cameras are currently typically equipped with a monitor such as a liquid-crystal display, and captured data can be played on the monitor. During playing on the monitor, power supplying to the image pickup unit including the lens driver may be stopped to save battery power.

Cameras having a known automatically opened and closed lens barrier are designed to close the lens barrier prior to the stop of power supplying to the image pickup unit. If the user attempts to start image pickup after stopping of the power supplying to the image pickup unit, the image pickup cannot immediately resume. This is because an action to open the lens barrier needs to be performed. If the image pickup unit is continuously powered without interruptions, the lens barrier can continuously stay opened, and image pickup can immediately resume. However, if the lens barrier remains opened, a chance that dirt sticks to the lens may increase and power consumption may be increased. The lens barrier is preferably closed.

In typical known cameras, power supplying to the image pickup unit is stopped after an elapse of a constant time subsequent to the switching to a play mode on a monitor. During the constant time subsequent to the switching to the play mode on the monitor, the lens barrier remains opened. Control of the lens barrier is operatively linked with an on/off control to the power supplying to the image pickup unit. Even when content is played on the monitor, the lens barrier remains opened with power supplied to the image pickup unit. The lens barrier is closed when power supplying to the image pickup unit stops.

SUMMARY OF THE INVENTION

It is desirable to provide an image pickup apparatus, a method of controlling the same, and a computer program for allowing a smooth switching between an image pickup state and a play state in an arrangement in which an opening and closing operation of a lens barrier is performed regardless of whether power is supplied to an image pickup unit including a lens driver, and for performing mode setting in the image pickup apparatus, control of the image pickup unit, saving of power, and lens barrier control for protecting a lens.

In accordance with one embodiment of the present invention, an image pickup apparatus includes an image pickup unit for picking up an image, a lens barrier for covering the front of a lens of the image pickup unit, a display for displaying image data recorded on a recording unit, and a controller for controlling mode switching of the image pickup apparatus in response to a mode switching command from a mode switching unit. The controller switches among three modes including an image pickup mode, a play mode, and a review mode. During the image pickup mode, power is supplied to the image pickup unit for the image pickup unit to pick up the image. During the play mode, data is played on the display with power supplied to the image pickup unit for a predetermined threshold time, and the power supplying to the image pickup unit is stopped after an elapse of the predetermined threshold time. During the review mode, data is played on the display with power supplied to the image pickup unit.

The controller may execute state control of the image pickup unit. During the image pickup mode, the controller sets an image pickup state to supply power to the image pickup unit for the image pickup unit to pick up the image. During the play mode, the controller sets a review state to supply power to the image pickup unit from the start of the play mode to within the threshold time, and sets an off state to stop supplying power to the image pickup unit subsequent to the elapse of the threshold time. During the review mode, the controller sets the review state to supply power to the image pickup unit.

The lens barrier may be shifted from an open state to a closed state at the mode switching from the image pickup mode to the play mode while being maintained at the open state at the mode switching from the image pickup mode to the review mode.

The image pickup unit may output a lens barrier driving signal to execute an opening and closing operation of the lens barrier in response to the state shifting of the image pickup unit, and the controller may output to the image pickup unit one of a validating command for validating the lens barrier driving signal and an invalidating command for invalidating the lens barrier driving signal thereby indirectly controlling the lens barrier during the state control of the image pickup unit. At least at the mode switching from the image pickup mode to the review mode, the controller outputs to the image pickup unit the invalidating command for invalidating the lens barrier driving signal to maintain the lens barrier at the open state.

The image pickup unit may output a lens barrier driving signal to execute an opening and closing operation of the lens barrier in response to the state shifting of the image pickup unit, and the controller may output to the image pickup unit one of a validating command for validating the lens barrier driving signal and an invalidating command for invalidating the lens barrier driving signal thereby indirectly controlling the lens barrier during the state control of the image pickup unit. At least at the mode switching from the image pickup mode to the play mode, the controller outputs to the image pickup unit the validating command for validating the lens barrier driving signal to shift the lens barrier from the open state to the closed state.

In accordance with one embodiment of the present invention, a method of controlling an image pickup apparatus includes a step of controlling a mode of the image pickup apparatus in response to a mode switching command from a mode switching unit. The mode controlling step includes switching among three modes including an image pickup mode, a play mode, and a review mode. During the image pickup mode, power is supplied to the image pickup unit for the image pickup unit to pick up the image. During the play mode, data is played on the display with power supplied to the image pickup unit for a predetermined threshold time, and the power supplying to the image pickup unit is stopped after an elapse of the predetermined threshold time. During the review mode, data is played on the display with power supplied to the image pickup unit.

The method may further include a step of controlling a state of the image pickup unit. The image pickup unit control step includes, during the image pickup mode, setting an image pickup state to supply power to the image pickup unit for the image pickup unit to pick up the image, during the play mode, setting a review state to supply power to the image pickup unit from the start of the play mode to within the threshold time, and then setting an off state to stop supplying power to the image pickup unit subsequent to the elapse of the threshold time, and during the review mode, setting the review state to supply power to the image pickup unit.

The method may further include a step of controlling a lens barrier covering the front of a lens of the image pickup unit. The lens barrier control step includes shifting the lens barrier from an open state to a closed state at the mode switching from the image pickup mode to the play mode while maintaining the lens barrier at the open state at the mode switching from the image pickup mode to the review mode.

The method may further include steps of outputting a lens barrier driving signal to perform an opening and closing operation of a lens barrier in response to the state shifting of the image pickup unit, and outputting to the image pickup unit one of a validating command for validating the lens barrier driving signal and an invalidating command for invalidating the lens barrier driving signal during the state control of the image pickup unit, wherein at least at the mode switching from the image pickup mode to the review mode, the invalidating command for invalidating the lens barrier driving signal is output to the image pickup unit to maintain the lens barrier at the open state.

The method may further include steps of outputting a lens barrier driving signal to execute an opening and closing operation of a lens barrier in response to the state shifting of the image pickup unit, and outputting to the image pickup unit one of a validating command for validating the lens barrier driving signal and an invalidating command for invalidating the lens barrier driving signal during the state control of the image pickup unit, wherein at least at the mode switching from the image pickup mode to the play mode, the validating command for validating the lens barrier driving signal is output to the image pickup unit to shift the lens barrier from the open state to the closed state.

In accordance with one embodiment of the present invention, a computer program for causing a controller to control an image pickup apparatus, includes a step of controlling a mode of the image pickup apparatus in response to a mode switching command from a mode switching unit. The mode controlling step includes switching among three modes including an image pickup mode, a play mode, and a review mode. During the image pickup mode, power is supplied to the image pickup unit for the image pickup unit to pick up the image. During the play mode, data is played on the display with power supplied to the image pickup unit for a predetermined threshold time, and the power supplying to the image pickup unit is stopped after an elapse of the predetermined threshold time. During the review mode, data is played on the display with power supplied to the image pickup unit.

The computer program in accordance with one embodiment of the present invention is supplied to a program code performing general-purpose computer system in a computer readable form using a storage medium such as a compact disk (CD), a floppy disk (FD), or a magneto-optical disk (MO), or a communication medium such as a network. By providing the computer program in a computer readable form, a process of the computer program is performed on the computer system.

These and other objects, features, and advantages of the present invention will become obvious from the following detailed discussion based on the embodiments of the present invention and the attached drawings. A system in this specification refers to a logical set of a plurality of apparatuses and is not limited to a single apparatus containing all elements in the same casing.

In accordance with embodiments of the present invention, the modes of the image pickup apparatus include the three modes, namely, (a) the image pickup mode in which power is supplied to the image pickup unit for the image pickup unit to pick up the image, (b) the play mode in which data is played on the display with power supplied to the image pickup unit for a predetermined threshold time, and the power supplying to the image pickup unit is stopped after an elapse of the predetermined threshold time, and (c) the review mode in which data is played on the display with power supplied to the image pickup unit.

During the review mode, the lens barrier is in the open state, and during the play mode, the lens barrier is in the closed state. When the apparatus is switched frequently between image pickup and play, the apparatus is limited to the review mode so that image pickup can resume immediately. When the apparatus is not frequently switched between image pickup and play, the lens barrier is closed as in the play mode. Optimum control is performed in response to the user's operational status with a lens protected.

BRIEF DESCRIPTION OF THE DRAWINGS

FIGS. 1A-1 through 1B-3 are external views of an image pickup apparatus and operation of a lens barrier thereof in accordance with one embodiment of the present invention;

FIG. 2 illustrates the image pickup apparatus in accordance with one embodiment of the present invention;

FIG. 3 illustrates modes, states of an image pickup unit, and states of a lens barrier in the image pickup apparatus in accordance with one embodiment of the present invention;

DESCRIPTION OF THE PREFERRED EMBODIMENTS

An image pickup apparatus, a method of controlling the image pickup apparatus, and a computer program are described in detail below with reference to the drawings.

As shown in FIGS. 1A-1 through 1B-3, the structure of the image pickup apparatus is described below. As examples of the image pickup apparatus of embodiments of the present invention, FIGS. 1A1-1B3 illustrate a video camera 110 for mainly capturing a moving image and a still camera 120 for capturing a still image. The image pickup apparatus includes a lens barrier as a lens protecting cover plate. The lens barrier is opened and closed under the control of a controller in the image pickup apparatus.

Figure 2:
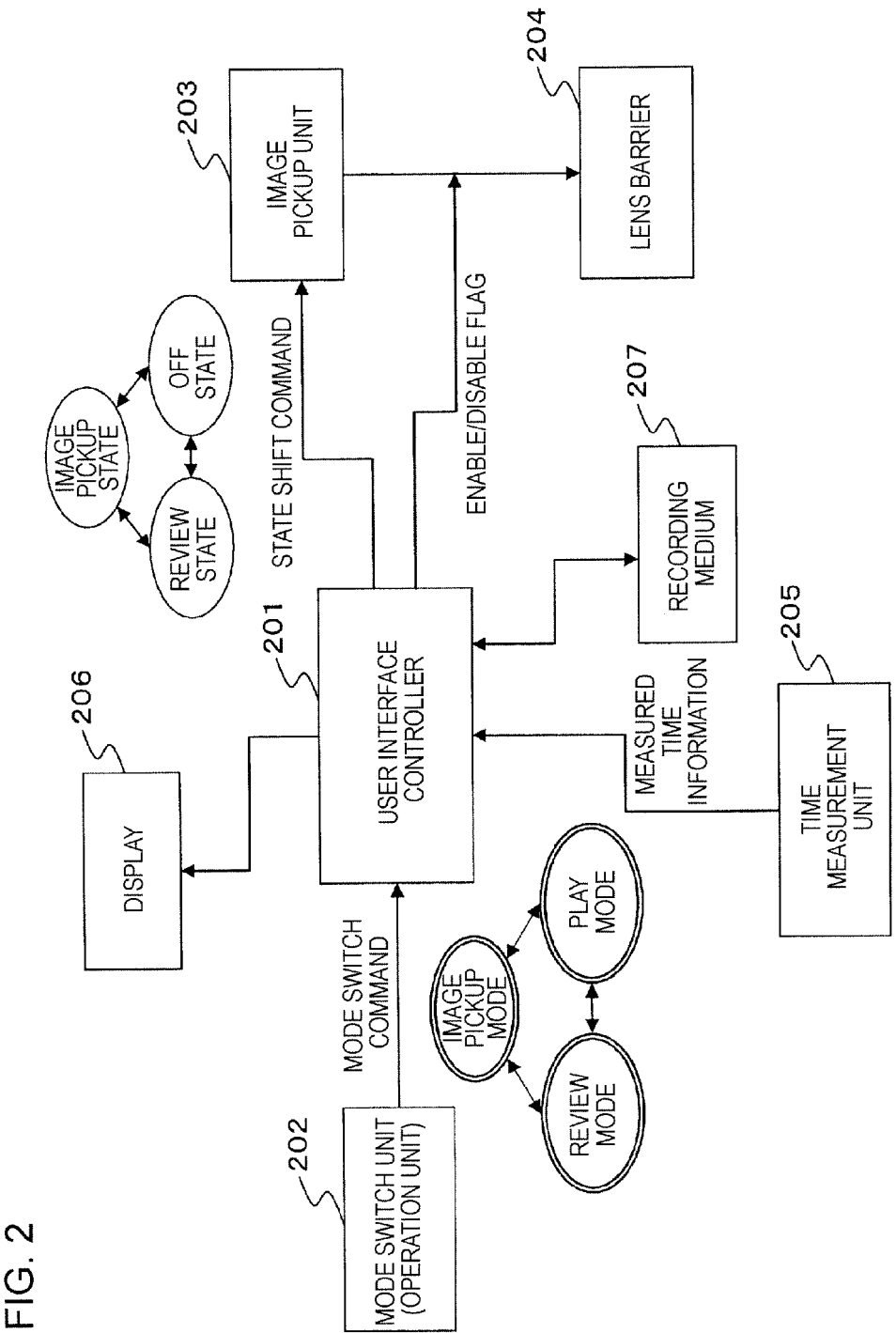

FIGS. 1A-1 through 1A-3 illustrates the video camera 110. FIGS. 1A-2 and 1A-3 are front views of the video camera 110. As shown in FIG. 1A-1, a lens barrier 112 is opened exposing a lens 111 outward. As shown in FIG. 1A-2, the lens barrier 112 is closed with the lens 111 covered therewith.

FIGS. 1B-1 through 1B-3 illustrate the still camera 120. As shown in FIG. 1B-2, a lens barrier 122 is opened exposing a lens 121 outward. As shown in FIG. 1B-3, the lens barrier 122 is closed with the lens 121 covered therewith.

The image pickup apparatuses of embodiments of the present invention are the video camera 110 and the still camera 120, and include lens barriers opened or closed depending on applications. The lens barrier is controlled by an image pickup unit and a controller in the image pickup apparatus.

FIG. 2 is a block diagram illustrating major elements of the image pickup apparatus in accordance with one embodiment of the present invention. The image pickup apparatus will be described in more detail later. As shown in FIG. 2, the image pickup apparatus includes a user interface (UI) controller 201 for generally controlling the image pickup apparatus, a mode switch unit 202 for switching modes with switches, an image pickup unit 203, including an optical element, for picking up a moving image and a still image, a lens barrier 204 as a lens cover in the image pickup unit 203, a time measurement unit (timer) 205, a display 206, and a recording medium 207.

The mode switch unit 202 serves as an input unit for the user interface controller 201, and may include hardware switches and software switches. The mode switch unit 202 inputs one of switch commands for an "image pickup mode," a "play mode," and a "review mode" to the user interface controller 201.

The modes of the image pickup apparatus include the three modes, namely, the "image pickup mode," the "play mode," and the "review mode."

During the "image pickup mode," an input signal acquired in an image pickup process of the image pickup unit 203 is recorded onto the recording medium 207 or enabled to be recorded onto the recording medium 207.

During the "image pickup mode," power is supplied to the image pickup unit 203.

During the "play mode," data recorded on the recording medium 207 is output to the display 206 or enabled to be output to the display 206.

During the "play mode," power may be supplied to the image pickup unit 203 (with the image pickup unit 203 in the review state) or power may not be supplied to the image pickup unit 203 (with the image pickup unit 203 off). Immediately after the start of the play mode, the image pickup unit 203 is shifted into the review state under the control of the user interface controller 201, and power is supplied to the image pickup unit 203. The elapse time subsequent to the start of the play mode is measured by the time measurement unit 205. When a predetermined constant time has elapsed, the image pickup unit 203 is shifted into an off state under the control of the user interface controller 201, and power supplying to the image pickup unit 203 is stopped. A specific process sequence of the image pickup apparatus will be described later.

During the "review mode," the data recorded on the recording medium 207 is reproduced and output to the display 206 or enabled to be reproduced and output to the display 206.

During the "review mode," power is supplied to the image pickup unit 203 as in the "play mode." More specifically, with the image pickup apparatus in the review mode, the review mode is maintained under the control of the user interface controller 201. Power is continuously supplied to the image pickup unit 203 so that the image pickup may immediately resume. A specific process sequence of that operation will be described later.

The user interface controller 201 performs the mode switching in response to a mode switching command from the mode switch unit 202, and performs state control of the image pickup unit 203. The state control of the image pickup unit 203 is performed in response to the mode switching command from the mode switch unit 202 and time measurement information from the time measurement unit 205. In the state control of the image pickup unit 203, the user interface controller 201 performs power control on the image pickup unit 203 in response to state setting.

The image pickup unit 203, including an optical system such as a lens, and an image pickup element, performs the image pickup process, and processes signals from a lens control section and a camera. The state of the image pickup unit 203 is switched under the control of the user interface controller 201. The image pickup unit 203 takes one of three states: an "off state," an "image pickup state," and a "review state."

The off state refers to one of states set with the image pickup apparatus in the play mode.

In the off state, no image pickup operation is performed, and the image pickup unit 203 is not supplied with power or is enabled to be cut off from power.

The image pickup state refers a state in which the image pickup apparatus is in the image pickup mode. An image captured by the image pickup unit 203 is ready to be recorded onto the recording medium 207.

In the image pickup state, the image pickup unit 203 is supplied with power.

The review state is set when the image pickup apparatus is in the review mode. The review state is one of states set when the image pickup apparatus is in the play mode.

In the review state, the image pickup unit 203 is supplied with power.

Figure 3:
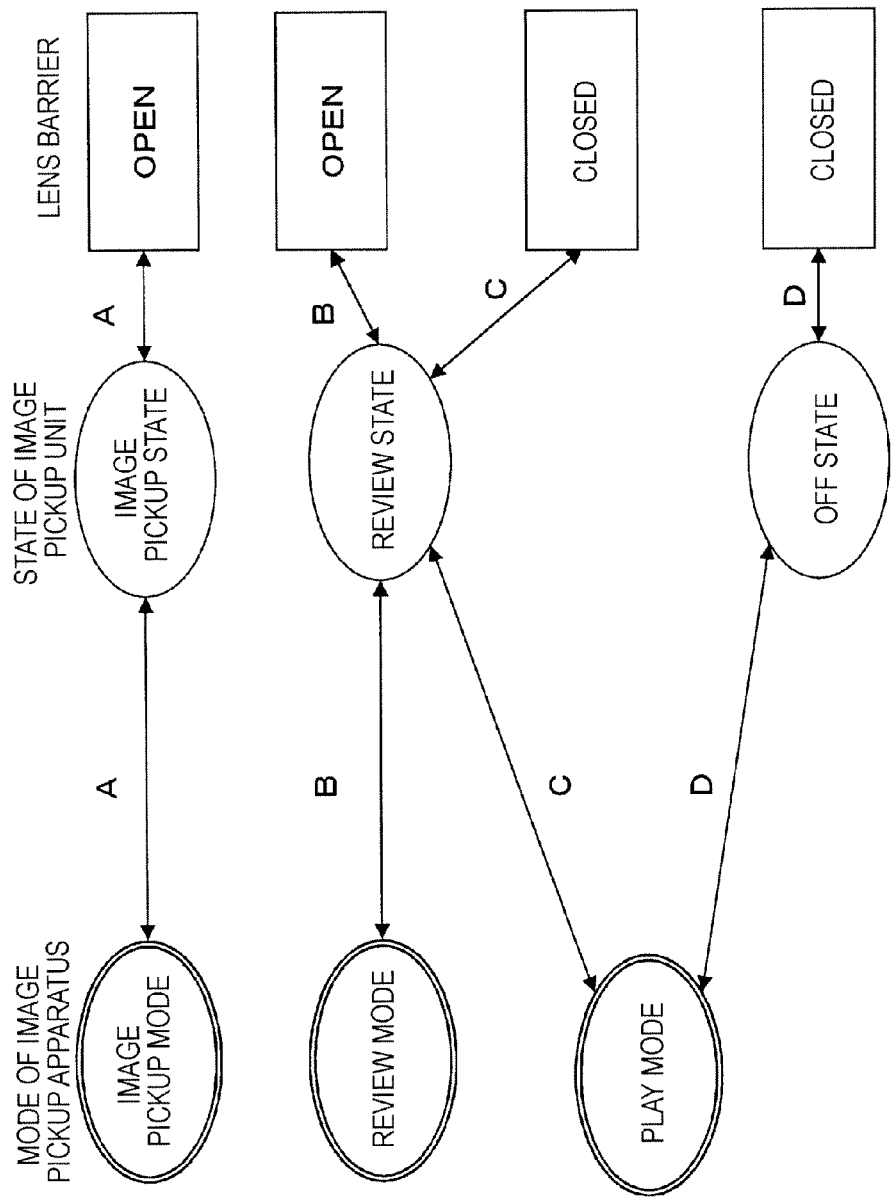

Mapping of the modes of the image pickup apparatus and the states of the image pickup unit 203 are described with reference to FIG. 3. As shown in FIG. 3, the image pickup apparatus takes one of the three modes, namely, the image pickup mode, the play mode, and the review mode. The image pickup unit 203 takes one of the three states, namely, the off state, the image pickup state, and the review state.

The modes and the states are combined in four operations as shown in FIG. 3.

A. Image Pickup Mode—Image pickup state
B. Review mode—Review state
C. Play mode—Review state
D. Play mode—Off state Setting of the modes and states will be described later. As shown in FIG. 3, an open state and a closed state of the lens barrier 204 and the modes of the image pickup apparatus and the states of the image pickup unit 203 are also mapped as will be discussed later.

The other elements shown in FIG. 2 are described below. The lens barrier 204 is a cover to protect a lens contained in the image pickup unit 203 from external dirt and finger prints. The lens barrier 204 is opened or closed in response to a lens barrier driving signal from the image pickup unit 203. The user interface controller 201 inputs to the image pickup unit 203 an enable/disable flag as a validating command or an invalidating command of the lens barrier driving signal. The user interface controller 201 indirectly controls the opening and closing operation of the lens barrier 204.

Mapping of the open state and the closed state of the lens barrier 204 and the modes of the image pickup apparatus and the states of the image pickup unit 203 is listed below as shown in FIG. 3:
A. Image pickup mode—Image pickup state: Open state
B. Review mode—Review state: Open state
C. Play mode—Review state: Closed state
D. Play mode—Off state: Closed state When the user operates the mode switch unit 202 to set the review mode in the image pickup apparatus, the image pickup unit 203 continuously remains in the review state. Power is supplied with the lens barrier 204 in the open state. When data is played or checked on the display 206 in the review mode, the user can immediately start image pickup at any time.

The user may operate the mode switch unit 202 to set the play mode on the image pickup apparatus. Immediately after the start of the play mode, the image pickup unit 203 is in the review mode with power supplied. After an elapse of a predetermined time (time up), the image pickup unit 203 is set to the off state with power cut off. When the play mode is set in the image pickup apparatus, the lens barrier 204 is set to the closed state, thereby protecting the lens from dirt.

When a sudden resumption of image pickup is planned, the image pickup apparatus may be set to the review mode. When no sudden resumption of image pickup is planned, the image pickup apparatus may be set to the play mode to protect the lens.

The mode switching in the image pickup apparatus, the states of the image pickup unit 203 and the open and closed states of the lens barrier 204 are described below with reference to FIGS. 4 through 6.

Figure 4:
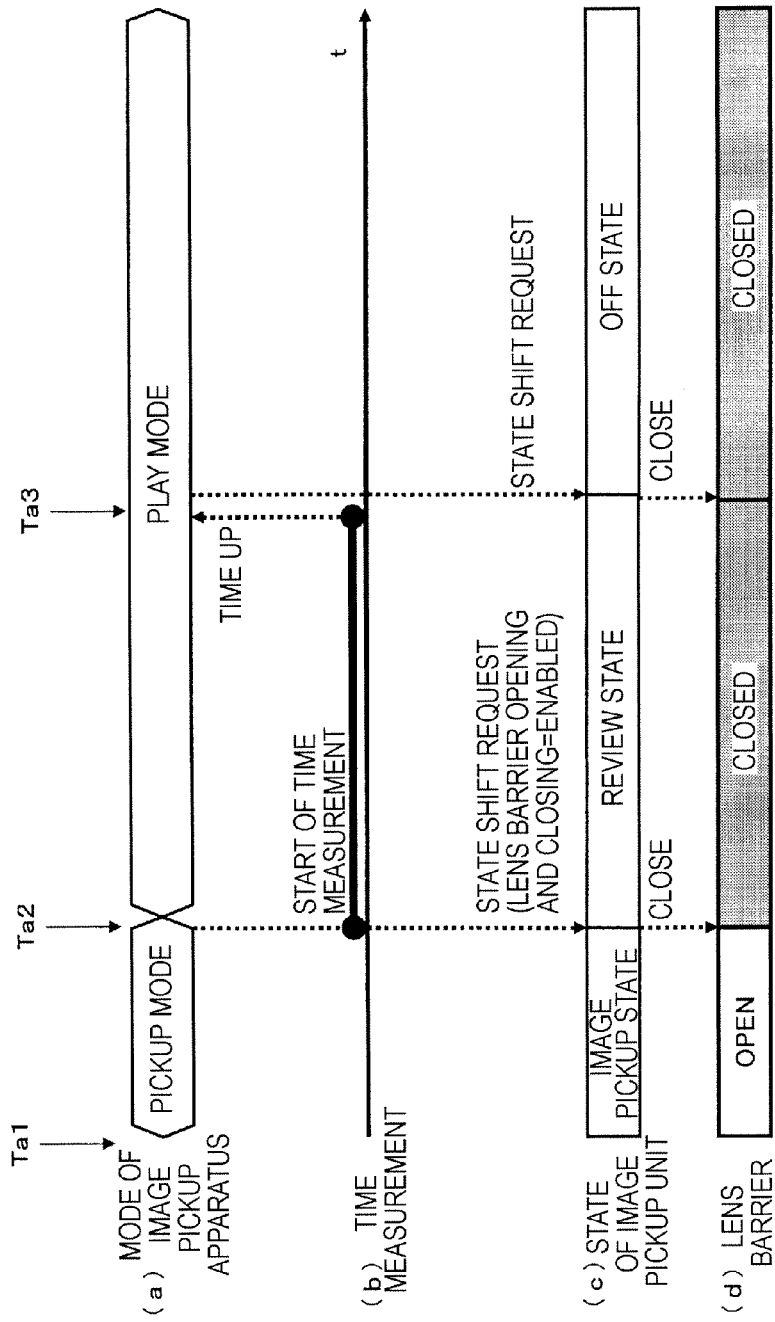
FIG. 4 illustrates a state shifting of the image pickup apparatus in accordance with one embodiment of the present invention.

FIG. 4 illustrates mode switching from the image pickup mode to the play mode. Shown in FIG. 4 is state shifting with time elapse in terms of (a) mode of the image pickup apparatus, (b) time measurement, (c) state of the image pickup unit, and (d) opening and closing of the lens barrier. Time (t) elapses from left to right.

During a period from time Ta1 to time Ta2, the image pickup apparatus is in the image pickup mode. When the image pickup apparatus is in the image pickup mode, setting A with the image pickup apparatus in the image pickup apparatus, the image pickup unit in the image pickup state and the lens barrier in the open state is set as previously discussed with reference to FIG. 3. During this period, the image pickup unit 203 can pick up images with power supplied thereto.

The mode switch unit 202 performs mode switching from the image pickup mode to the play mode with switches at time Ta2. A mode switching signal is input to the user interface controller 201. In response to the mode switching signal, the user interface controller 201 shifts the image pickup unit 203 from the image pickup state to the review state. From the mode switch time (Ta2), the time measurement unit 205 starts measuring time.

The user interface controller 201 pre-stores a threshold time (Th), and continuously maintains the image pickup unit 203 in the review state with power supplied to the image pickup unit 203 from the start of the play mode to the completion of the threshold time (Th). When the threshold time (TH) has elapsed (at time Ta3 of FIG. 4), the user interface controller 201 switches the state of the image pickup unit 203 from the review state to the off state, thereby stopping supplying power to the image pickup unit 203.

At this state shifting, the lens barrier 204 is shifted from the open state to the closed state at time Ta2 on the premise that the mode has been shifted from the image pickup mode to the play mode.

As previously discussed, the opening and closing operation of the lens barrier 204 is performed in response to the lens barrier driving signal. The user interface controller 201 is ready to input to the image pickup unit 203 an enable/disable flag as a validating command or an invalidating command to validate or invalidate the lens barrier driving signal. The user interface controller 201 thus indirectly controls the opening and closing operation of the lens barrier 204.

When the mode is switched from the image pickup mode to the play mode, the user interface controller 201 switches the state of the image pickup unit 203 from the image pickup state to the review state while outputting to the image pickup unit 203 an enable flag as a validating command to validate the lens barrier driving signal. Along with the shifting from the image pickup state to the review state, the image pickup unit 203 outputs the lens barrier driving signal for closing the lens barrier 204. The lens barrier 204 is thus shifted from the open state to the closed state. Since the enable/disable flag of the lens barrier is set to an enable status, the lens barrier 204 is closed.

From the start of the play mode to the end of the threshold time, the user interface controller 201 sets the image pickup unit 203 in the review state with power supplied to the image pickup unit 203. When the threshold time (Th) has elapsed (at time Ta3 of FIG. 4), the user interface controller 201 switches the image pickup unit 203 from the review state to the off state. At the shifting of state, the image pickup unit 203 may output the lens barrier driving signal to switch the lens barrier 204 from the open state to the closed state. However, since the lens barrier 204 is already closed, no actual closing action is performed. The enable/disable flag of the lens barrier 204 may be set to any of enable setting and disable setting.

Figure 5:
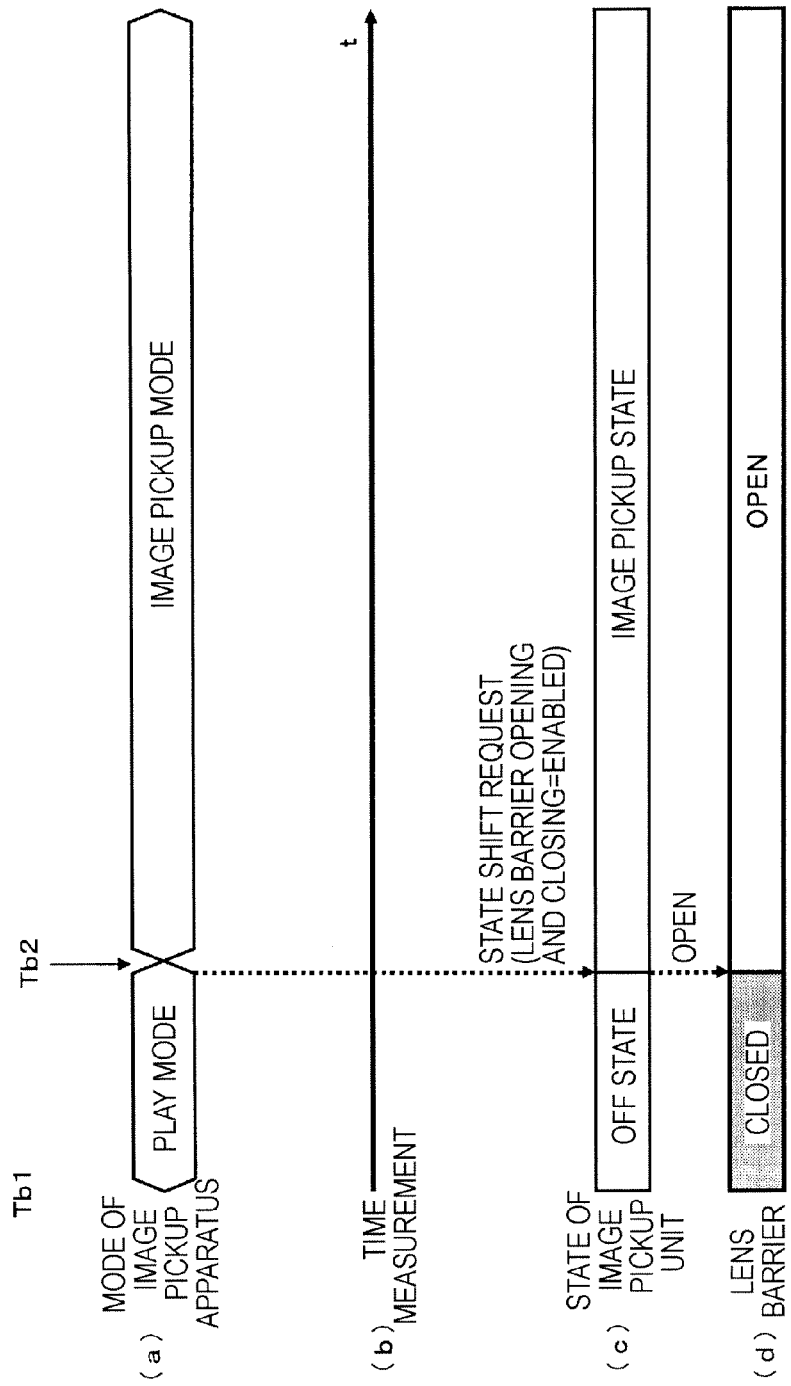
FIG. 5 illustrates a state shifting of the image pickup apparatus in accordance with one embodiment of the present invention.

FIG. 5 illustrates mode switching from the play mode to the image pickup mode. As FIG. 4 does, FIG. 5 illustrates state shifting with time elapse in terms of (a) mode of the image pickup apparatus, (b) time measurement, (c) state of the image pickup unit, and (d) opening and closing of the lens barrier. From left to right, time (t) elapses.

During a period from Tb1 to Tb2, the image pickup apparatus is in the play mode. When the image pickup apparatus is in the play mode, the image pickup apparatus may be in either setting C with the image pickup apparatus in the play mode, the image pickup unit in the review state and the lens barrier in the closed state or setting D with the image pickup apparatus in the play mode, the image pickup unit in the off state and the lens barrier in the closed state as previously discussed with reference to FIG. 3. FIG. 5 illustrates the switching process from the play mode to the image pickup mode with the setting D with the image pickup apparatus in the play mode, the image pickup unit in the off state and the lens barrier in the closed state.

At time Tb2, the mode switch unit 202 performs mode switching from the play mode to the image pickup mode with switches. A mode switching signal is input to the user interface controller 201. In response to the mode switching signal, the user interface controller 201 shifts the image pickup unit 203 from the off state to the image pickup state.

At this state shifting, the lens barrier 204 is shifted from the closed state to the open state at time Tb2 on the premise that the mode has been shifted from the play mode to the image pickup mode.

As previously discussed, the opening and closing operation of the lens barrier 204 is performed in response to the lens barrier driving signal. The user interface controller 201 inputs to the image pickup unit 203 an enable flag as a validating command to validate the lens barrier driving signal.

When the mode is shifted from the play mode to the image pickup mode, the user interface controller 201 switches the state of the image pickup unit 203 from the off state to the image pickup state while outputting to the image pickup unit 203 an enable flag as a validating command to validate the lens barrier driving signal. Along with the switching from the off state to the image pickup state, the image pickup unit 203 outputs the lens barrier driving signal for opening the lens barrier 204. The lens barrier 204 is thus shifted from the closed state to the opened state. Since the enable/disable flag of the lens barrier is set to an enable status, the lens barrier 204 is opened.

When the image pickup apparatus is in the play mode, one of the settings C and D is effective as previously discussed with reference to FIG. 3.

When the image pickup apparatus is switched from the play mode to the image pickup mode, the user interface controller 201 shifts the image pickup apparatus from the review state to the image pickup state or from the off state to the image pickup state. At this state shifting, the user interface controller 201 issues to the image pickup unit 203 an enable flag as a validating command to validate the lens barrier driving signal.

Along with the state shifting from the off state to the image pickup state or from the review state to the image pickup state, the image pickup unit 203 outputs the lens barrier driving signal for opening the lens barrier 204. The lens barrier 204 is shifted from the closed state to the open state. Since the enable/disable flag for lens barrier opening and closing is set to enable, the lens barrier 204 is opened.

Figure 6:
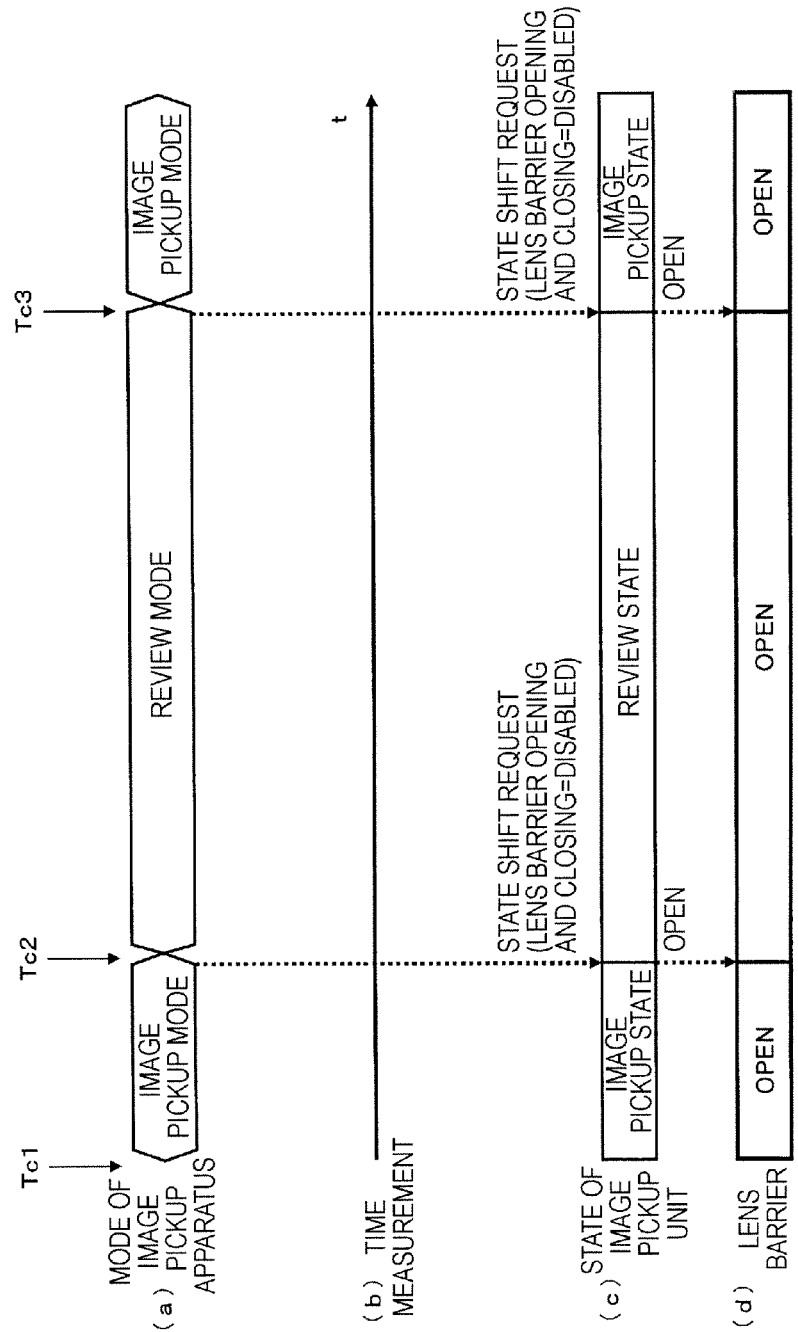
FIG. 6 illustrates a state shifting of the image pickup apparatus in accordance with one embodiment of the present invention.

FIG. 6 illustrates a mode shifting process of the image pickup apparatus that is transitioned from the image pickup mode to the review mode and then from the review mode to the image pickup mode. As FIG. 4 does, FIG. 6 illustrates state shifting with time elapse in terms of (a) mode of the image pickup apparatus, (b) time measurement, (c) state of the image pickup unit, and (d) opening and closing of the lens barrier. From left to right, time (t) elapses.

During a period from time Tc1 to time Tc2, the image pickup apparatus is in the image pickup mode. When the image pickup apparatus is in the image pickup mode, setting A with the image pickup apparatus in the image pickup apparatus, the image pickup unit in the image pickup state and the lens barrier in the open state is set as previously discussed with reference to FIG. 3. During this period, the image pickup unit 203 can pick up images with power supplied thereto.

The mode switch unit 202 performs mode switching from the image pickup mode to the review mode with switches at time Tc2. A mode switching signal is input to the user interface controller 201. In response to the mode switching signal, the user interface controller 201 shifts the image pickup unit 203 from the image pickup state to the review state. This shifting process is identical to the shifting process from the image pickup mode to the play mode as discussed with reference to FIG. 4. However, when the state is shifted from the image pickup state to the review state, the time measurement performed by the time measurement unit 205 in the shifting to the play mode is not performed.

As previously discussed, throughout the review mode, the image pickup unit 203 remains in the review state. More specifically, the setting B with the image pickup apparatus in the review mode, the image pickup unit in the review state and the lens barrier in the open state is set as previously discussed with reference to FIG. 3. At the mode switching from the image pickup mode to the play mode, the image pickup unit 203 remains in the review state until the threshold time, and then switched to the off state. The time measurement unit 205 is thus used for time measurement. During the review mode, however, the image pickup unit 203 remains in the review state, and is continuously supplied with power. The lens barrier 204 is also set to the open state. Image pickup can immediately resume. More specifically, the review mode is appropriate for the user who may wish to pick up images while reviewing a captured image during the image pickup. Throughout the review mode, power supplying to the image pickup unit 203 is not stopped while the lens barrier 204 is not closed.

In response to the mode switching at time Tc2, the user interface controller 201 shifts the image pickup unit 203 from the image pickup state to the review state while outputting to the image pickup unit 203 a disable flag as an invalidating command to invalidate the lens barrier driving signal. Even if the image pickup unit 203 outputs the lens barrier driving signal for closing the lens barrier 204 at the shifting from the image pickup state to the review mode at time Tc2, the lens barrier driving signal is invalidated by the disable flag as the invalidating command to invalidate the lens barrier driving signal. As a result, the lens barrier 204 remains at the open state.

In both the mode switching from the image pickup mode to the play mode discussed with reference to FIG. 4 and the mode switching from the image pickup mode to the review mode discussed with reference to FIG. 6, the image pickup unit 203 shifts from the image pickup state to the review state, thereby taking the same shifting process. Without a particular program, the image pickup unit 203 performs the same process. As a result, the lens barrier driving signal for shifting the lens barrier 204 from the open state to the closed state is output. At the mode switching from the image pickup mode to the review mode, the user interface controller 201 outputs the disable flag as the invalidating command to invalidate the lens barrier driving signal. The lens barrier driving signal is thus invalidated, and the lens barrier 204 remains in the open state.

When the mode is switched from the image pickup mode to the play mode as discussed with reference to FIG. 4, the user interface controller 201 outputs to the image pickup unit 203 the enable flag as the validating command to validate the lens barrier driving signal. The lens barrier driving signal is thus validated, and as a result, the lens barrier 204 is shifted from the open state to the closed state.

FIG. 6 illustrates the mode switching from the review mode to the image pickup mode. At time Tc3, the mode switch unit 202 performs the mode switching using switches. More specifically, the mode is switched from the review mode to the image pickup mode. The mode switching signal is input to the user interface controller 201, and the user interface controller 201 shifts the image pickup unit 203 from the review state to the image pickup state.

At this switching, the image pickup unit 203 outputs the lens barrier driving signal. More specifically, the lens barrier driving signal for opening the lens barrier 204 is output at the state shifting of the image pickup unit discussed with reference to FIG. 5, namely, at the state shifting from the off state to the image pickup state. As previously discussed with reference to FIG. 4, when the image pickup apparatus is in the play mode, the lens barrier 204 remains in the closed state regardless of whether the image pickup unit 203 is in either the review state and the off state. When the image pickup apparatus is switched to the play mode with the image pickup unit 203 in either the review state or the off state, the image pickup unit 203 shifts to the image pickup state. The lens barrier driving signal for opening the lens barrier 204 is output to shift the lens barrier 204 from the closed state to the open state.

At the mode switching from the review mode to the image pickup mode at time Tc3 of FIG. 6, the image pickup unit 203 is shifted from the review state to the image pickup state, thereby taking the same state shifting process as from the play mode to the image pickup mode. Without a particular program, the image pickup unit 203 performs the same process. As a result, the lens barrier driving signal for shifting the lens barrier 204 from the closed state to the open state is output. At the mode switching from the review mode to the image pickup mode, the user interface controller 201 outputs the disable flag as the invalidating command to invalidate the lens barrier driving signal. The lens barrier driving signal is thus invalidated, and the lens barrier 204 remains in the open state.

The user interface controller 201 performs the mode switching from the image pickup mode to the review mode and then from the review mode to the image pickup mode.

At the mode switching, the user interface controller 201 issues a disable flag as the invalidating command to invalidate the lens barrier driving signal, thereby invalidating the lens barrier driving signal output by the image pickup unit 203. The lens barrier 204 is maintained at the open state. As a result, the image pickup can immediately resume during the review mode.

Figure 7:
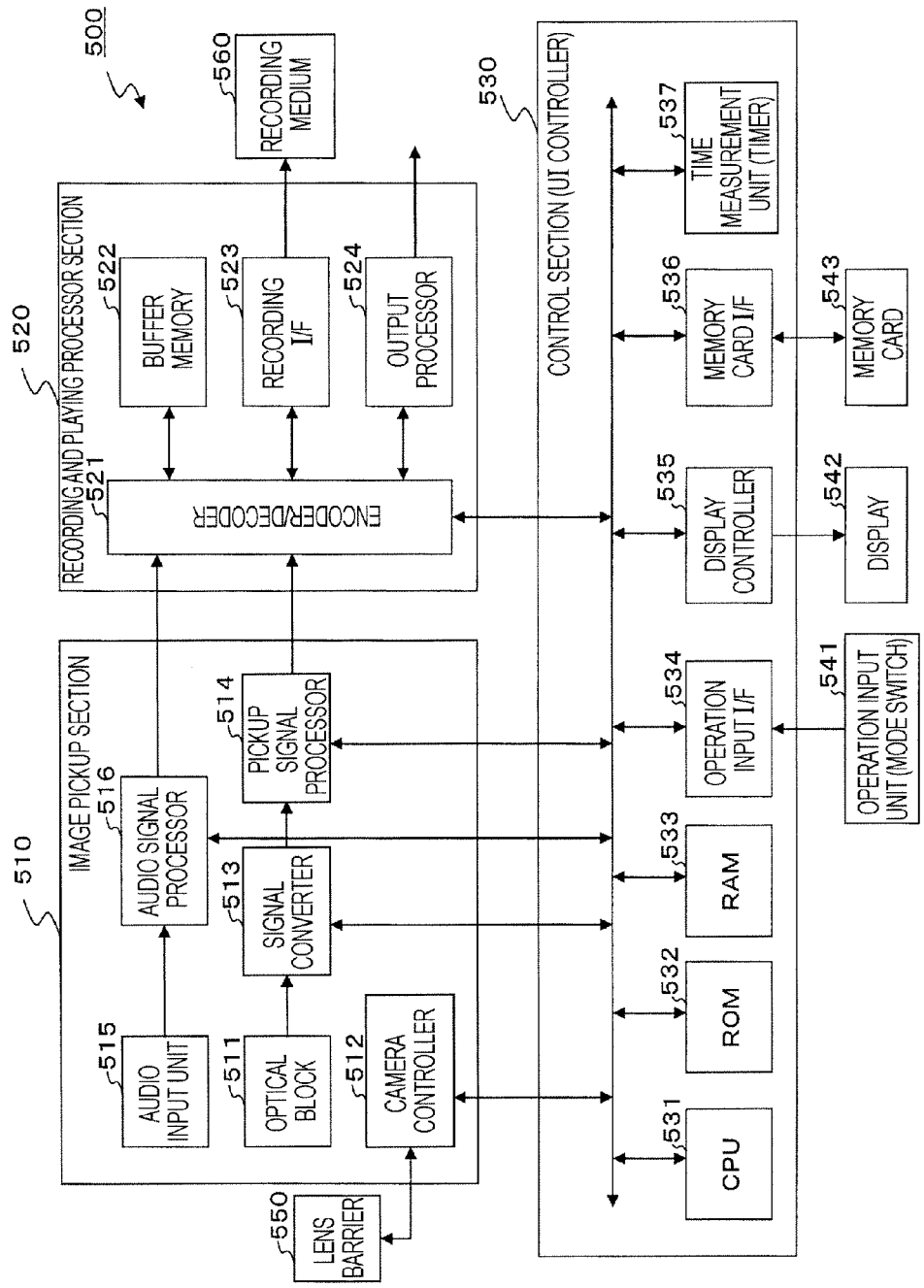
FIG. 7 illustrates a hardware configuration of the image pickup apparatus in accordance with one embodiment of the present invention.

An image pickup apparatus 500 in accordance with one embodiment of the present invention is described in detail with reference to FIG. 7. FIG. 7 illustrates the structure of the image pickup apparatus 500. The image pickup apparatus 500 includes as the major elements thereof an image pickup section 510, a recording and playing processor section 520, a control section 530, a lens barrier 550, a recording medium 560, an operation input unit 541, a display 542, and a memory card 543.

The user interface controller 201 of FIG. 2 is included in the control section 530. The mode switch unit 202 of FIG. 2 corresponds to an operation input unit 541 of FIG. 7. The image pickup unit 203 corresponds to the image pickup section 510, and the lens barrier 204 corresponds to the lens barrier 550. The time measurement unit 205 corresponds to a time measurement unit 537 in the control section 530. The display 206 of FIG. 2 corresponds to the display 542 of FIG. 7, and the recording medium 207 of FIG. 2 corresponds to the recording medium 560.

The image pickup section 510 includes an optical block 511, a camera controller 512, a signal converter 513, a pickup signal processor 514, an audio input unit 515, and an audio signal processor 516. The optical block 511 includes a lens unit for picking up an image of a subject, an aperture diaphragm adjusting mechanism, a focus adjusting mechanism, a zoom mechanism, a shutter mechanism, a flash mechanism, and an image stabilization mechanism. The camera controller 512 receives a control signal from the control section 530 and generates a control signal to be supplied to the optical block 511. The camera controller 512 controls zoom control, shutter control, and exposure control by supplying the generated control signal to the optical block 511. The camera controller 512 further performs opening and closing control of the lens barrier 550. As previously discussed, the camera controller 512 outputs the lens barrier driving signal to set the lens barrier 550 to the open state or the closed state.

The signal converter 513 includes an image pickup element such as a charge-coupled device (CCD) and an image of a subject is focused on the focusing surface of the signal converter 513 through the optical block 511. Upon receiving an image capturing signal supplied from the control section 530 in response to a shutter operation, the signal converter 513 converts the subject image focused on the focusing surface into an image signal and then supplies the image signal to the pickup signal processor 514.

In response to a control signal from the control section 530, the pickup signal processor 514 performs gamma correction and automatic gain control (AGC) on the image signal while converting the image signal into a video signal as a digital signal. The audio input unit 515 picks up sound surrounding the subject during image pickup. An audio signal from the audio input unit 515 is supplied to an audio signal processor 516. In response to a control signal from the control section 530, the audio signal processor 516 performs correction process and ACG process on the audio signal while converting the audio signal into a digital audio signal.

As previously discussed with reference to FIG. 2, the control section 530 controls the image pickup section 510 in one of the three states of the image pickup state, the review state, and the off state. More specifically, the control section 530 sets the image pickup section 510 to one of the image pickup state, the review state, and the off state in accordance with the mode set by the operation input unit 541 and the time measured by the time measurement unit 537.

Along with the state shifting, the control section 530 outputs to the camera controller 512 of the image pickup section 510 the enable/disable flag as the validating/invalidating command to validate/invalidate the lens barrier driving signal.

The recording and playing processor section 520 includes an encoder/decoder 521, a buffer memory 522, a recording interface 523, and an output processor 524. The encoder/decoder 521 encodes and multiplexes the video signal, the audio signal and additional recording information from the image pickup section 510. On the other hand, the encoder/decoder 521 separates and decode the video signal, the audio signal and the additional recording information from compressed data. In response to a control signal from the control section 530, the encoder/decoder 521 performs automatic white balance control, exposure correction control, expansion operation responsive to a digital zoom magnification ratio on the video signal from the pickup signal processor 514.

Upon receiving the compressed data from the encoder/decoder 521, the recording interface 523 writes the received data onto the recording medium 560. The recording interface 523 reads compressed data from the recording medium 560 and supplies the read data to the encoder/decoder 521. The output processor 524 under the control of the control section 530 supplies the compressed data from the encoder/decoder 521 to one of the control section 530 and an external apparatus. The buffer memory 522, composed of a SDRAM, serves as a working area for encoding and decoding process of the encoder/decoder 521.

The control section 530 includes a central processing unit (CPU) 531 for executing a variety of control programs, a read-only memory (ROM) 532, a random-access memory (RAM) 533, an operation input interface 534 for connecting the operation input unit 541, a display controller 535 for connecting the display 542, a memory card interface 536 for connecting a memory card 543, and a time measurement unit 537 for recording image pickup time and measuring time for a state shifting trigger as previously discussed. All these elements are interconnected to each other via a system bus.

The CPU 531 generally controls the control section 530, and uses the RAM 533 as the working area therefor. The ROM 532 stores a program for controlling the image pickup section 510 and a program for controlling recording and playing of the video signal and the audio signal.

The operation input unit 541 connected to the operation input interface 534 includes a plurality of keys such as a mode switching key for switching between the image pickup mode, the play mode and the review mode, a zoom adjusting key, an exposure control key, a shutter key, a moving image pickup key, and a display adjusting key on the display 542. The operation input interface 534 relays an operation signal from the operation input unit 541 to the CPU 531. The CPU 531 determines which key is operated on the operation input unit 541 and then performs control process in response to the determination result.

The display 542 connected to the display controller 535 includes a liquid-crystal display (LCD) and under the control of the control section 530 displays the video signal from the image pickup section 510 and the video signal read from the recording medium 560.

The memory card interface 536 writes the compressed data from the encoder/decoder 521 onto the memory card 543. The memory card interface 536 reads compressed data from the memory card 543 and supplies the read compressed data to the encoder/decoder 521. The time measurement unit 537 generates, as attribute information of pickup data, time information representing the year, the month, the day, the hour, the minute, and the second, and measures time for use in mode switching and state shifting.

The particular embodiments of the present invention have been discussed. It is obvious that those of ordinary skill in the art can made changes and modifications to the embodiments without departing from the scope of the present invention. The embodiments of the present invention have been discussed for exemplary purposes only and are not intended to limit the scope of the invention. The scope of the present invention is limited only by the appended claims.

The series of aforementioned process steps may be performed using hardware, software or a combination of both. If the process steps are performed using software, a program containing a process sequence may be performed by installing the program onto a memory in a computer built in a dedicated hardware structure or onto a general-purpose computer that executes a variety of processes.

The program may be pre-recorded on a recording medium such as a hard disk or a read-only memory (ROM). The program may be stored temporarily or permanently on one of removable media including a flexible disk, a compact disk read-only memory (CD-ROM), a magneto-optical (MO) disk, a1 digital versatile disk (DVD), a magnetic disk, or a semiconductor memory. The removable media may be supplied as package software.

The program may be installed from the removable medium to the computer. Alternatively, the program may be transmitted to the computer in a wireless fashion or a wired fashion through a network such as a local area network (LAN) or the Internet. The computer receives the program thus transmitted and stores onto a recording medium such as an internal hard disk.

The aforementioned process steps may be performed in the sequential order as stated. Alternatively, the aforementioned process steps may be performed in parallel or separately depending on the throughput of the apparatus that performs the process steps. In the context of this specification, the system refers to a logical set of a plurality of apparatuses and is not limited to an apparatus that contains elements within the same casing.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup apparatus comprising:
   an image pickup unit for picking up an image;
   a lens barrier for covering the front of a lens of the image pickup unit;
   a display for displaying image data recorded on a recording unit; and
   a controller for controlling mode switching of the image pickup apparatus in response to a mode switching command from a mode switching unit,
   the controller switching among three modes including an image pickup mode, a play mode, and a review mode, the image pickup mode supplying power to the image pickup unit for the image pickup unit to pick up the image, the play mode playing data on the display, executing power supplying to the image pickup unit for a predetermined threshold time, and stopping the power supplying to the image pickup unit after an elapse of the predetermined threshold time, and the review mode playing data on the display while executing the power supplying to the image pickup unit,
   wherein the controller executes state control of the image pickup unit,
      during the image pickup mode, sets an image pickup state to supply power to the image pickup unit for the image pickup unit to pick up the image,
      during the play mode, sets a review state to supply power to the image pickup unit from the start of the play mode to within the threshold time, and sets an off state to stop supplying power to the image pickup unit subsequent to the elapse of the threshold time, and
      during the review mode, sets the review state to supply power to the image pickup unit, and
   wherein the image pickup unit outputs a lens barrier driving signal to execute an opening and closing operation of the lens barrier in response to a state shifting of the image pickup unit, and
   wherein the controller outputs to the image pickup unit one of a validating command for validating the lens barrier driving signal and an invalidating command for invalidating the lens barrier driving signal thereby indirectly controlling the lens barrier during the state control of the image pickup unit, and at least at the mode switching from the image pickup mode to the review mode, outputs to the image pickup unit the invalidating command for invalidating the lens barrier driving signal to maintain the lens barrier at the open state.

2. The image pickup apparatus according to claim 1, wherein the lens barrier is shifted from an open state to a closed state at the mode switching from the image pickup mode to the play mode while being maintained at the open state at the mode switching from the image pickup mode to the review mode.

3. The image pickup apparatus according to claim 1, wherein the image pickup unit outputs a lens barrier driving signal to execute an opening and closing operation of the lens barrier in response to a state shifting of the image pickup unit, and wherein the controller outputs to the image pickup unit one of a validating command for validating the lens barrier driving signal and an invalidating command for invalidating the lens barrier driving signal thereby indirectly controlling the lens barrier during the state control of the image pickup unit, and at least at the mode switching from the image pickup mode to the play mode, outputs to the image pickup unit the validating command for validating the lens barrier driving signal to shift the lens baffler from the open state to the closed state.

4. A method of controlling an image pickup apparatus comprising:

a step of controlling a mode of the image pickup apparatus in response to a mode switching command from a mode switching unit, the mode controlling step including switching among three modes including an image pickup mode, a play mode, and a review mode, the image pickup mode supplying power to an image pickup unit for the image pickup unit to pick up the image, the play mode playing data on a display, executing power supplying to the image pickup unit for a predetermined threshold time, and stopping the power supplying to the image pickup unit after an elapse of the predetermined threshold time, and the review mode playing data on the display while executing the power supplying to the image pickup unit;

a step of controlling a state of the image pickup unit, the image pickup unit control step including, during the image pickup mode setting an image pickup state to supply power to the image pickup unit for the image pickup unit to pick up the image, during the play mode setting a review state to supply power to the image pickup unit from the start of the play mode to within the threshold time and setting an off state to stop supplying power to the image pickup unit subsequent to the elapse of the threshold time, and during the review mode setting the review state to supply power to the image pickup unit;

outputting a lens barrier driving signal to perform an opening and closing operation of a lens barrier in response to a state shifting of the image pickup unit; and outputting to the image pickup unit one of a validating command for validating the lens barrier driving signal and an invalidating command for invalidating the lens barrier driving signal during the state control of the image pickup unit, wherein at least at the mode switching from the image pickup mode to the review mode, the invalidating command for invalidating the lens barrier driving signal is output to the image pickup unit to maintain the lens barrier at the open state.

5. The method according to claim 4, further comprising a step of controlling a lens barrier covering the front of a lens of the image pickup unit, the lens barrier control step including shifting the lens barrier from an open state to a closed state at the mode switching from the image pickup mode to the play mode while maintaining the lens barrier at the open state at the mode switching from the image pickup mode to the review mode.

6. The method according to claim 4, further comprising steps of:

outputting a lens barrier driving signal to execute an opening and closing operation of a lens barrier in response to a state shifting of the image pickup unit; and outputting to the image pickup unit one of a validating command for validating the lens barrier driving signal and an invalidating command for invalidating the lens barrier driving signal during the state control of the image pickup unit, wherein at least at the mode switching from the image pickup mode to the play mode, the validating command for validating the lens barrier driving signal is output to the image pickup unit to shift the lens barrier from the open state to the closed state.

7. A computer readable storage medium encoded with computer program instructions which, when executed cause a processor to execute a method for causing a controller to control an image pickup apparatus, comprising:

a step of controlling a mode of the image pickup apparatus in response to a mode switching command from a mode switching unit, the mode controlling step including switching among three modes including an image pickup mode, a play mode, and a review mode, the image pickup mode supplying power to an image pickup unit for the image pickup unit to pick up the image, the play mode playing data on a display, executing power supplying to the image pickup unit for a predetermined threshold time, and stopping the power supplying to the image pickup unit after an elapse of the predetermined threshold time, and the review mode playing data on the display while executing the power supplying to the image pickup unit;

a step of controlling a state of the image pickup unit, the image pickup unit control step including, during the image pickup mode setting an image pickup state to supply power to the image pickup unit for the image pickup unit to pick up the image, during the play mode setting a review state to supply power to the image pickup unit from the start of the play mode to within the threshold time and setting an off state to stop supplying power to the image pickup unit subsequent to the elapse of the threshold time, and during the review mode setting the review state to supply power to the image pickup unit;

outputting a lens barrier driving signal to perform an opening and closing operation of a lens barrier in response to a state shifting of the image pickup unit; and outputting to the image pickup unit one of a validating command for validating the lens barrier driving signal and an invalidating command for invalidating the lens barrier driving signal during the state control of the image pickup unit, wherein at least at the mode switching from the image pickup mode to the review mode, the invalidating command for invalidating the lens barrier driving signal is output to the image pickup unit to maintain the lens barrier at the open state.

* * * * *